(12) United States Patent
Gonzalez

(10) Patent No.: US 10,133,884 B2
(45) Date of Patent: Nov. 20, 2018

(54) ELECTRONIC AND PAPER COMBINED DATA SUBMISSION, PRINTING, AND RETRIEVAL METHOD AND ITS SYSTEM

(71) Applicant: Fujian Foxit Software Development Joint Stock Co., Ltd., Fuzhou (CN)

(72) Inventor: Carlos Gonzalez, Madrid (ES)

(73) Assignee: Fujian Foxit Software Development Joint Stock Co., Ltd., Fuzhou (CN)

( * ) Notice: Subject to any disclaimer, the term of this patent is extended or adjusted under 35 U.S.C. 154(b) by 0 days.

(21) Appl. No.: 15/543,727

(22) PCT Filed: Jan. 30, 2015

(86) PCT No.: PCT/CN2015/000071
§ 371 (c)(1),
(2) Date: Jul. 14, 2017

(87) PCT Pub. No.: WO2016/119084
PCT Pub. Date: Aug. 4, 2016

(65) Prior Publication Data
US 2018/0004983 A1  Jan. 4, 2018

(51) Int. Cl.
*G06K 1/12* (2006.01)
*G06F 21/62* (2013.01)
(Continued)

(52) U.S. Cl.
CPC ....... *G06K 1/121* (2013.01); *G06F 17/30879* (2013.01); *G06F 21/602* (2013.01);
(Continued)

(58) Field of Classification Search
CPC ............ G06F 17/30879; G06K 7/1413; G06K 7/1417; G06K 1/121
(Continued)

(56) References Cited

U.S. PATENT DOCUMENTS 5,506,697 A * 4/1996 Li ........................... G06F 3/002
                                                              235/462.09
5,644,408 A * 7/1997 Li ........................... G06F 3/002
                                                              358/442
(Continued)

FOREIGN PATENT DOCUMENTS

CN       103714483        4/2014
CN       103942016        7/2014
(Continued)

OTHER PUBLICATIONS

Machine Translation of Tan, Xiyu (CN103714483), published Apr. 9, 2014, retrieved from Espacenet.com on Feb. 12, 2018.*
(Continued)

*Primary Examiner* — Paultep Savusdiphol
(74) *Attorney, Agent, or Firm* — Rankin, Hill & Clark LLP

(57) ABSTRACT

An electronic and paper combined data submission, printing, and retrieval method includes: completing an application in a client terminal, sending the user-entered data in the client terminal to a remote storage server; printing the completed application together with a barcode containing a unique identification code; retrieving the electronic data stored in the remote storage server by scanning said identification code. A system includes: a data encryption module; a data transmission module; an identification code module; a print module; a scan module; an analysis module; a data retrieve module; and a data decryption module.

13 Claims, 2 Drawing Sheets

(51) Int. Cl.
    *G06F 17/30*     (2006.01)
    *G06F 21/60*     (2013.01)
    *G06K 7/10*     (2006.01)
    *G06K 7/14*     (2006.01)

(52) U.S. Cl.
    CPC ..... *G06F 21/6227* (2013.01); *G06K 7/10881* (2013.01); *G06K 7/1413* (2013.01); *G06K 7/1417* (2013.01)

(58) Field of Classification Search
    USPC ................. 235/375, 462.01, 462.08, 470
    See application file for complete search history.

(56) References Cited

U.S. PATENT DOCUMENTS

| | | | | |
|---|---|---|---|---|
| 5,754,308 | A * | 5/1998 | Lopresti | H04N 1/32133 |
| | | | | 235/375 |
| 5,760,382 | A * | 6/1998 | Li | G06F 3/002 |
| | | | | 235/436 |
| 7,469,833 | B1 * | 12/2008 | Kelley | G06K 17/0022 |
| | | | | 235/376 |
| 7,865,042 | B2 * | 1/2011 | Cattrone | G06F 17/30011 |
| | | | | 235/462.01 |
| 8,294,923 | B2 * | 10/2012 | Gonzalez Marti | G06F 17/243 |
| | | | | 235/462.01 |
| 2005/0224571 | A1 * | 10/2005 | Kelley | G06F 17/2247 |
| | | | | 235/375 |
| 2005/0224572 | A1 * | 10/2005 | Kelley | G06F 17/211 |
| | | | | 235/375 |
| 2013/0060713 | A1 | 3/2013 | Xu | |

FOREIGN PATENT DOCUMENTS

CN     103942585     7/2014
CN     103963486     8/2014

OTHER PUBLICATIONS

International Search Report filed in PCT/CN2015/000071 dated Oct. 30, 2015.

* cited by examiner

ELECTRONIC AND PAPER COMBINED DATA SUBMISSION, PRINTING, AND RETRIEVAL METHOD AND ITS SYSTEM

TECHNICAL FIELD

The present invention relates to the field of information collection technology, in particular, relates to an electronic and paper combined data submission, printing, and retrieval method and its system which store and retrieve the information from printed applications securely and quickly.

BACKGROUND OF THE TECHNOLOGY

With the development of information office, the information needs to be acquired or extracted from printed applications and saved in the background system to be processed further when the printed applications are received or involved in data collection processes in the enterprises. The APPLICATION represents a form of interaction of a user with an entity in which the entity requests data in a structured format and the user provides said requested data in said structured format. An application may contain one or many forms, as well as other documents/information. In addition, the printed application refers to a printed matter using paper as the carrier of the information in the application. The current techniques used to capture the data from the printed applications go from 2D barcodes to OCR (Optical Character Recognition), and also manually keying the data as a last resource. These three methods above depend highly on the print quality of the paper document received. In addition, their cost is high, labor intensive, and the two latter methods (OCR and Manual Type In) are prone to getting errors easily.

Therefore, how to improve the quality of the data acquisition from printed applications becomes an important problem that needs to be solved.

SUMMARY OF THE INVENTION

The purpose of the present invention is to provide an electronic and paper combined data submission, printing, and retrieval method and its system to overcome the shortage of the current technologies of capturing data from printed applications, as well as enhance the operation and the facilitation of data collection.

In order to achieve the above purpose, the present invention first provides a kind of electronic and paper combined data submission, printing, and retrieval method, which comprises the following steps:

P1: Completing an application on-screen on a client terminal;

P2: sending user-entered data in a client terminal to a remote storage server;

P3: printing the user-entered data into paper form with a unique identification code;

P4: scanning said identification code to retrieve the data stored in the remote storage server when the printed application is received.

According to a preferred design of the innovation, wherein the steps of sending the user-entered data in a client terminal to a remote storage server of P2 includes:

Generating a unique random encryption code to encrypt the user-entered data in the client terminal before is sent to the remote storage server.

Replying with a storage code to the client terminal by said remote storage server once the remote storage server receives the encrypted data.

According to a preferred design of the innovation, wherein an identification code is generated by the combination of said encryption code and said storage code.

According to a preferred design of the innovation, wherein the method for scanning the identification code includes:

Scanning the identification code from the printed application into the computer using a handheld scanner directly or Scanning the printed application, and then using a barcode reading library to extract the data from the identification code found in the scanned image.

According to a preferred design of the innovation, wherein the steps to retrieve the electronic data stored in the remote storage server include:

Retrieve the encrypted record from the remote storage server using the storage code obtained from said identification code;

Decoding said encrypted record using the encryption code obtained from said identification code to get the original user-entered data.

According to a preferred design of the innovation, the carrier of said user-entered data in the client terminal may be Fill-able PDF Forms, web pages, web applications or desktop applications.

According to a preferred design of the innovation, wherein said identification code can be represented as a one-dimensional bar code or a two-dimensional bar code.

According to a preferred design of the innovation, when the user-entered data is changed in the client terminal, steps P1 to P3 need to be repeated.

In addition, the present invention also provides an electronic and paper combined data submission, printing, and retrieval system, which includes:

A data transmission module is applied to transmit the user-entered data in a client terminal to the remote storage server;

An identification code module, which is connected to said data transmission module, is used to generate an unique identification code corresponding to said user-entered data;

A printing module, which is connected to said identification code module, is used to print said user-entered data together with said identification code, resulting in the printed application;

A scanning module is used to scan the identification code on the printed application;

An analysis module, which is connected to the scan module, is used to analyze the scanned identification code to get the relative information;

A data retrieve module, which is connected to the analysis module, is used to retrieve the electronic data stored in the remote storage server using the information obtained from said analysis module.

According to a preferred design of the innovation, wherein the system also includes an encryption module and a code return module. Said encryption module, connected to said data transmission module and said identification code module, is used to generate a unique random encryption code to encrypt the user-entered data before is sent to the remote storage server; said code return module, connected to said identification code module, is used to return a storage code to the client terminal once the remote storage server receives the encrypted user-entered data.

According to a preferred design of the innovation, wherein said identification code module generates the identification code by the combination of said encryption code and said storage code.

According to a preferred design of the innovation, wherein said scan module scans the identification code from the printed application into the computer using a handheld scanner directly or The scan module scans the printed application, and then uses a barcode reading library to extract the data from the identification code found in the scanned image.

According to a preferred design of the innovation, wherein system includes an analysis module. Said analysis module obtains the encryption code and the storage code by analyzing said identification code.

According to a preferred design of the innovation, wherein said data retrieve module retrieves the records from the remote storage server using the storage code obtained from the identification code, and then decodes the records using the encryption code obtained from the identification code.

According to a preferred design of the innovation, the records in said remote storage server are deleted at scheduled regular intervals.

According to a preferred design of the innovation, wherein said identification code is represented as a one-dimensional bar code or a two-dimensional bar code.

According to a preferred design of the innovation, wherein the carrier of said user-entered data in client terminal includes Fill-able PDF Forms, web pages, web applications or desktop applications.

Compared with the prior technologies, the present invention provides electronic data submission method and its submission system to transmit the user-entered data in a client terminal to a remote storage server before the application is printed on paper, and an electronic data collection method based on the identification code present in the received printed application, instead of extracting the information from the printed application directly after it has been received.

By applying the method and the system described in the present invention, the electronic data acquisition is less dependent on the print quality of the papers and the current graphic character recognition methods, or manual data-entry methods. In addition, the background system can retrieve the user-entered data saved previously using the identification code printed on the printed application, and the data collection operation can be enhanced significantly, eliminating errors and false positives quite frequent in other data collection techniques, and also eliminating manual labor and its associated costs.

DETAILED DESCRIPTION OF THE EMBODIMENTS

With reference to said accompanying drawings in the embodiments of the present invent, the description of the technical proposal of implementations of the present invention is given clearly and integrality as following in order to be understood by the technicians in this field. The given implementations are only part of the implementations to the present invention obviously, but not entire implementations. Based on the implementations of the present invention, all of the other implementations which get without devoting a creative work by the ordinary technicians in this field should be deemed to be within the scope of the present invention.

The present invention describes a method and system to perform data collection that facilitates the data capture efforts and eliminates many of the current technical problems associated with capturing data from printed applications when printed applications are involved as a part of a data collection process.

Today, when a printed application is received by a data collection entity or department, its data needs to be captured from the printed application and entered into back-end systems for further processing. Usually the application is first completed on screen in a client terminal. The concrete forms of user-entered data carrier in practice may be Fill-able PDF Form, Fill-able webpage, web apps (web applications) and desktop apps (desktop applications), and then the user-entered data is printed and submitted to the concerned data collection department as a printed application. What the present invention does is transfers and stores the user-entered data of the applications before they are printed to avoid the secondary conversion process of printing the application first and transforming the paper form contents into the electronic data again using the current technologies. Therefore, it reduces or lowers the error rate fundamentally, and guarantees the optimal quality of the retrieved user-entered data. In addition, data is permanently encrypted through the whole data-transmission process and can only be decrypted using the encryption key found in the printed application.

Figure 1:
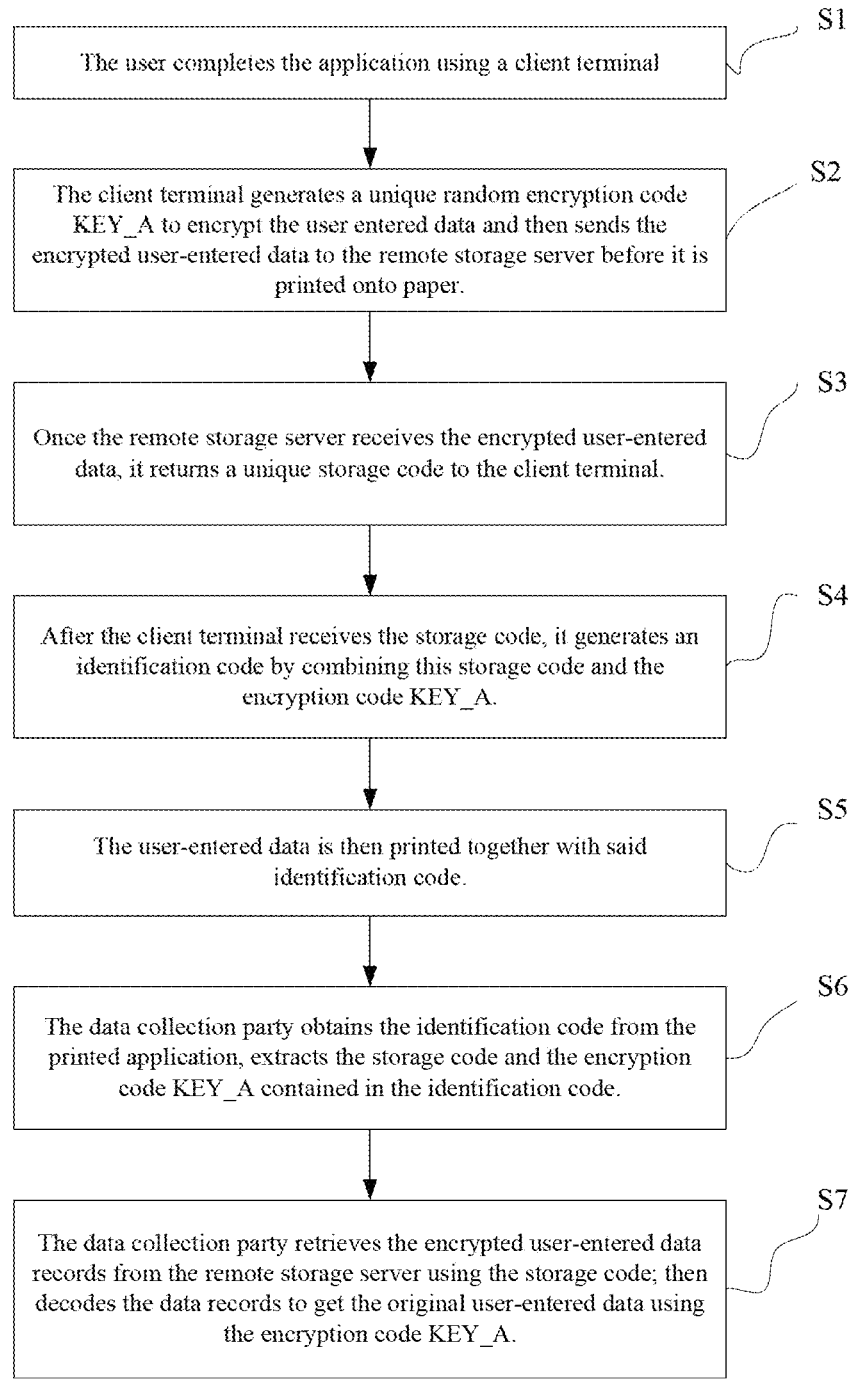
FIG. 1 shows a flow diagram of the electronic and paper combined data submission, printing, and retrieval method according to a preferred embodiment of the present invention.

Please refer to FIG. 1, which shows a flow diagram of the electronic and paper combined data submission, printing, and retrieval method according to a preferred embodiment of the present invention. The specific steps of which are as follows:

S1: The user completes the application using a client terminal;

S2: The client terminal generates a unique random encryption code KEY_A to encrypt the user entered data and then sends the encrypted user-entered data to the remote storage server before it is printed onto paper. Therein, it is to be noted that the encryption key is never transmitted. For Fill-able PDF Forms, it is to encrypt the form data typed-in by user with the unique random encryption code KEY_A, and then the encrypted data is sent to the remote storage server.

S3: Once the remote storage server receives the encrypted user-entered data, it returns a unique storage code to the client terminal.

S4: After the client terminal receives the storage code, it generates an identification code by combining this storage code and the encryption code KEY_A.

S5: The user-entered data is then printed together with said identification code.

S6: The data collection party obtains the identification code from the printed application, extracts the storage code and the encryption code KEY_A contained in the identification code.

S7: The data collection party retrieves the encrypted user-entered data records from the remote storage server using the storage code; then decodes the data records to get the original user-entered data using the encryption code KEY_A.

Said client software can include such as Fill-able PDF Forms, Word documents, Excel documents, network questionnaire, network application programs, desktop applications and other diversified formats. Here, setting the fill-able PDF Forms as an example to give a detailed description of said paper forms submission method with electronic data capture function.

When the user completes a fill-able PDF Form on the screen, the user-entered data in the fill-able PDF form is transmitted to the remote storage server at the time of printing the document, but before the document is printed.

For security reasons, a unique random key KEY_A is generated inside the Fill-able PDF Form to encrypt the user-entered data before the data is transmitted. And once the remote storage server receives said encrypted data, it replies with a storage code to the Fill-able PDF Form.

The Fill-able PDF form receives and combines this storage code with the KEY_A (used to encrypt the user-entered data before it is sent to the server) into a unique identification code that is printed with the rest of the form data. In particular, said identification code can be represented as a one-dimensional bar code- or a two-dimensional bar or other forms. In the embodiment of the present invention, its two-dimensional bar code is as an example to be given in the detailed description.

After this communication takes place between the client device and the remote storage server, the form can be printed.

The description above is the upload process of the Fill-able PDF Forms data, and the following is the data extraction process. Once the form is printed, it should be submitted to the relevant entity/department that needs to collect its data. Then, data collection department may scan the two-dimensional bar code on the printed form. The specific scanning approach can be directly scanning two-dimensional bar code on the printed form with a hand-held scanner, or scanning the whole printed form, and then extracting the bar code data from the scanned image using a two-dimensional bar code reading library. The scanning approach applied in the practical embodiment usually depends on the volume of applications/forms to process.

The storage code and the random key KEY_A are obtained from the scanned two-dimensional bar code. The data collection department can download the user-entered data records corresponding to said printed form from the remote storage server by using the storage code. At this moment, the user-entered data records are still encrypted, which can ensure the privacy of the data throughout the network transmission process. The random key KEY_A can be used to decrypt the obtained user-entered data. The original data on the printed application can always be acquired using alternative methods in case the identification code cannot be read and decoded.

When the user modifies the typed-in data in the client terminal, the processes of data upload need to be repeated. That is, Fill-able PDF Form will generate a new unique random encryption code KEY_A to encrypt the user modified data, and the encrypted data would be transferred to the remote storage server; the remote storage server will reply with a new storage code when it receives the encrypted user modified data. The new two-dimensional bar code, which is generated by combining said new random key KEY_A with the new storage code, is then printed and waits to be extracted from the printed application by the data collection department.

Figure 2:
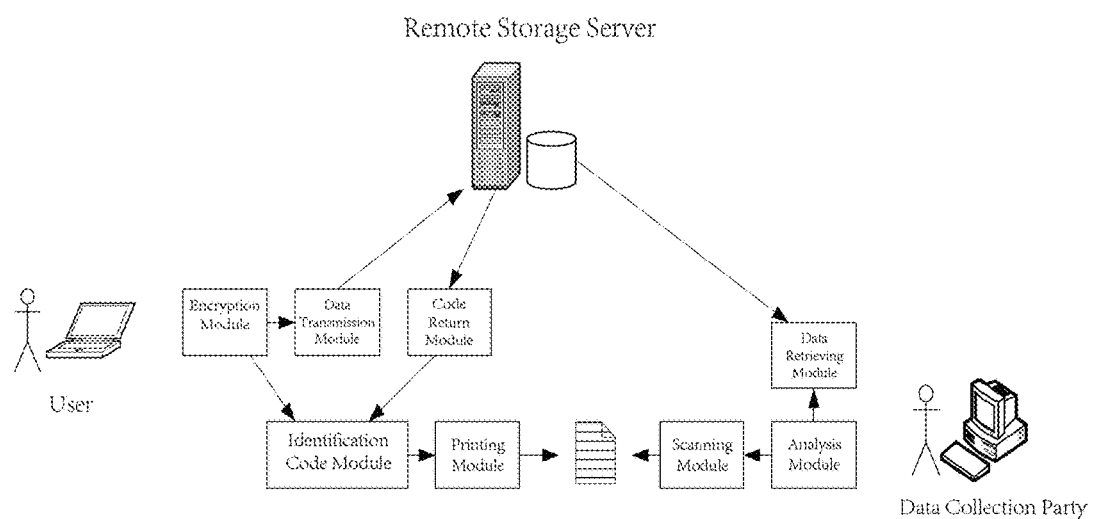
FIG. 2 shows a structure block diagram of the electronic and paper combined data submission, printing, and retrieval system according to a preferred embodiment of the present invention.

In addition, the present invention also provides an electronic and paper combined data submission, printing, and retrieval system; please refer to FIG. 2 for details. As shown in FIG. 2, the user enters the data in the client software, wherein, said client software can include such as Fill-able PDF Forms, Word documents, Excel documents, network questionnaire, network application programs, desktop applications and other diversified formats. The encryption module firstly generates a unique random encryption code KEY_A to encrypt the user entered data and send it to the remote storage server through the data transmission module before it is printed (when the print command is sent but the print process has not been completed). Once the remote storage server receives the encrypted user entered data, it returns a storage code to the return code module. And then the identification ID code module generates an identification code by combining said random encryption code KEY_A generated from the encryption module and said storage code generated from the return code module. Said identification code can be presented as a one-dimensional bar code or a two-dimensional bar code. In an embodiment of the present invention, we use the two-dimensional bar code as an example to give a detailed description. After the unique two-dimensional bar code corresponding to the user-entered data is generated, the user then can print the completed application and handle it to the data collection party. Wherein said printed application contains said two-dimensional bar code.

After receiving the printed application, the collection party firstly uses the scan module to scan the two-dimensional code on the printed application. The specific scanning method can be directly scanning two-dimensional bar code with a hand-held scanner, or scanning the whole printed application, and then extracting the barcode data of the scanned images with a two-dimensional barcode identification code library. The scanned two-dimensional barcode then goes into the analysis module for data processing. Said analysis module extracts the encryption key KEY_A, which generated previously, and storage code from the two-dimensional barcode. And then the data retrieve module retrieves the encrypted user-entered data records from the remote storage server using the storage code, and decodes the data retrieved using the encryption code KEY_A, so as to get the original user entered data submitted by the filling party.

The data filled-in is allowed to be modified after submission. The user can modify the entered data, then the encryption module will generate a new unique random encryption key KEY_A to encrypt the modified data, and transfer it to the remote storage server through the data transmission module. Once the remote storage server receives the modified, encrypted data, it replies a new storage code back to the return code module. The identification code module generates a new identification code by combining said new random encryption code KEY_A and said new storage code.

The system may also generate a number of "never retrieved" records. This happens when a user performs more than one submission of the same application data. A user may print a form and save the original PDF fill-able form in its hard drive. This user may then change the data in the saved form at a later date, print it again and then submit this "second printed version" of the form instead of the first one. The database will now have two records of the same form, with two different storage codes. Once the printed application is received by the entity/department that needs to collect its data, only the record of the effectively submitted printed application will be retrieved thanks to its unique storage code. The other record, generated in the first submission, will stay in the database and will never be retrieved.

For these reasons, the remote storage server of the present invention includes the option of eliminating non-retrieved records at regular intervals; in order to clear invalid data in time, save the storage space, improve the execution efficiency of the system.

In summary, the present invention relates to an electronic and paper combined data submission, printing, and retrieval method and its system. By applying the present invention, printed applications can be used with wet signatures (which is a legal must in thousands of processes), while the need to capture the data from the printed applications with traditional methods is eliminated.

The above description of the present invention is only illustrative and is not intended to limit the invention. The present invention of any modification, improvement, equivalent replacement, etc. in the understanding of the ordinary technicians in this field, where is within the spirit and scope without departing from the limited spirit and scope of the following appended claims, should be deemed to be within the scope of the present invention.

What is claimed is:

1. An electronic and paper combined data submission, printing, and retrieval method, comprising:
    P1: completing an application on a screen in a client terminal when a user enters data;
    P2: sending the user-entered data in a client terminal to a remote storage server;
    P3: printing the completed application with a unique identification code;
    P4: scanning said identification code to retrieve the user-entered data stored in the remote storage server when the printed application is received by a data collection party;
    wherein the steps of sending the user-entered data in a client terminal to a remote storage server of P2 includes:
    generating a unique random encryption code to encrypt the user-entered data in the client terminal before the data is sent to the remote storage server; and
    replying with a unique storage code to the client terminal by said remote storage server, once the remote storage server stores the received data;
    wherein, in the step of sending the user-entered data in a client terminal to a remote storage server of P3:
    said identification code is generated by the combination of said encryption code and said storage code.

2. The electronic and paper combined data submission, printing, and retrieval method according to claim 1, wherein the steps of retrieving the data stored in the remote storage server includes: retrieving the encrypted record from the remote storage server by using the unique storage code which is obtained from said identification code; and decoding said record using the encryption code which is obtained from said identification code, to get the original user-entered data.

3. The electronic and paper combined data submission, printing, and retrieval method according to claim 1 wherein the method for scanning the identification code includes:
    scanning the identification code from the printed application into the computer using a handheld scanner directly or
    scanning the whole printed application, and then using a barcode reading library to extract the data from the identification code found in the scanned image.

4. The electronic and paper combined data submission, printing, and retrieval method according to claim 1, the carrier of said user-entered data in the client terminal may be fillable PDF Forms or desktop applications.

5. The electronic and paper combined data submission, printing, and retrieval method according to claim 1, wherein said identification code can be represented as one of the one-dimensional bar code or two-dimensional bar code.

6. The electronic and paper combined data submission, printing, and retrieval method according to claim 1, where when the user-entered data is changed in the client terminal, and steps P1 to P3 are repeated.

7. An electronic and paper combined data submission, printing, and retrieval system, comprising:
    a data transmission module applied to transmit user-entered data to a remote storage server;
    an identification code module, which is connected to said data transmission module, used to generate a unique identification code corresponding to said user-entered data;
    a printing module, which is connected to said identification code module, used to print said user-entered data together with the identification code, resulting in a printed application;
    a scanning module used to scan the identification code on the printed application;
    an analysis module, which is connected to the scan module, used to analyze the scanned identification code to obtain relative information;
    a data retrieve module, which is connected to the analysis module, used to retrieve the data stored in the remote storage server by the relative information obtained from said analysis module;
    an encryption module connected to said data transmission module and said identification code module, which is used to generate a unique random encryption code to encrypt the user-entered data;
    wherein said identification code module generates the identification code by the combination of said encryption code and said storage code; and
    a code return module connected to said identification code module, which is used to return a storage code to the client terminal once the remote storage server receives the encrypted data.

8. The electronic and paper combined data submission, printing, and retrieval system according to claim 7, wherein said analysis module obtains the encryption code and the storage code by analyzing said identification code.

9. The electronic and paper combined data submission, printing, and retrieval system according to claim 8, wherein said data retrieve module retrieves the records from the remote storage server using the storage code obtained from the identification code, and then decodes the records with the encryption code obtained from the identification code.

10. The electronic and paper combined data submission, printing, and retrieval system according to claim 7, wherein said scan module scans the identification code from the printed application into the computer using a handheld scanner directly or
    the scan module scans the whole printed application with the identification code, and then uses a barcode reading library to extract the data from the identification code found in the scanned image.

11. The electronic and paper combined data submission, printing, and retrieval system according to claim 7, the records in said remote storage server are deleted at scheduled regular intervals.

12. The electronic and paper combined data submission, printing, and retrieval system according to claim 7, wherein said identification code is represented as a one-dimensional bar code or a two-dimensional bar code in the printed application.

13. The electronic and paper combined data submission, printing, and retrieval system according to claim 7, wherein the carrier of said user-entered data in client terminal includes fillable PDF Forms, web pages, web applications or desktop applications.

* * * * *